United States Patent [19]
Tinant et al.

[11] Patent Number: 5,779,954
[45] Date of Patent: Jul. 14, 1998

[54] PROCESS FOR MANUFACTURING A HOLLOW BODY

[75] Inventors: Anne Tinant, Brussels; Roger Houba, Gembloux, both of Belgium

[73] Assignee: Solvay (Société Anonyme), Brussels, Belgium

[21] Appl. No.: 614,999

[22] Filed: Mar. 13, 1996

[30] Foreign Application Priority Data

Mar. 14, 1995 [BE] Belgium ............... 09500225

[51] Int. Cl.$^6$ ........................................... C08J 7/00
[52] U.S. Cl. ................ 264/83; 264/232; 264/349; 264/340
[58] Field of Search ................ 428/36.6; 264/83, 264/349, 211, 82, 85, 340, 344, 232, 233

[56] References Cited

U.S. PATENT DOCUMENTS

| | | |
|---|---|---|
| 523,910 | 1/1894 | Miller et al. |
| 3,613,957 | 10/1971 | Walker. |
| 3,911,184 | 10/1975 | Caskey et al. |
| 5,378,414 | 1/1995 | Derkach ............... 264/469 |
| 5,554,426 | 9/1996 | Rober et al. ........... 428/36.6 |
| 5,567,491 | 10/1996 | Vezzoli et al. ........ 428/36.6 |

FOREIGN PATENT DOCUMENTS

| | | |
|---|---|---|
| 740763 | 10/1968 | Belgium. |
| 0578082A2 | 1/1994 | European Pat. Off.. |
| A-70030600 | 10/1970 | Japan. |
| A-57012041 | 1/1982 | Japan. |
| 62-187033 | 8/1987 | Japan ................ 428/36.6 |
| A-0120437 | 8/1989 | Japan. |
| 2-1734 | 1/1990 | Japan ................ 428/36.6 |
| 52906 | 1/1967 | Luxembourg. |
| WO93/01049 | 1/1993 | WIPO ................ 428/36.6 |

*Primary Examiner*—Mathieu D. Vargot
*Attorney, Agent, or Firm*—Spencer & Frank

[57] ABSTRACT

Process for manufacturing a hollow body including a plastic, in which at least one polyalkyleneimine is added to the plastic.

5 Claims, No Drawings

5,779,954

PROCESS FOR MANUFACTURING A HOLLOW BODY

FIELD OF THE INVENTION

The present invention relates to a process for manufacturing a hollow body including a plastic.

TECHNOLOGY REVIEW

Hollow bodies, for example bottles or tanks, are in most cases used to contain a fluid to which they are substantially impermeable. Metallic materials have been used for a long time to manufacture such hollow bodies. Nowadays, plastics offer many advantages for this purpose, especially their easy processing, their lightness and their lesser sensitivity to corrosion. Nevertheless, most common plastics are not perfectly impermeable to certain organic substances, especially to certain constituents present in fuels. In particular, the relative impermeability of the plastics which are commonly used and subjected to a surface treatment is very substantially affected by the presence of traces of water and by the incorporation into the fuels of one or more alcohols, such as ethanol or methanol for example. Furthermore, the statutory requirements regarding acceptable emissions into the environment from fuel tanks in particular are increasingly stringent, especially because of the environmental constraints. It is therefore necessary to be able to provide hollow bodies which exhibit substantially greater impermeability, in particular to the new fuels mentioned above.

It is known to subject plastic-based hollow bodies to a surface treatment in order to improve their impermeability, for example a fluorination or sulphonation treatment, in particular of their internal surface. By way of example of such a surface treatment, document BE-740763 discloses the sulphonation of a container in the presence of sulphur trioxide. Nevertheless, the impermeability exhibited by a container treated in this way remains poor with regard to the abovementioned requirements.

SUMMARY OF THE INVENTION

The object of the present invention is therefore to be able to manufacture hollow bodies having a high impermeability, in particular to the abovementioned fuels.

For this purpose, the invention relates to a process for manufacturing a hollow body including a plastic, which is characterized in that at least one polyalkyleneimine is added to the plastic.

DETAILED DESCRIPTION OF THE INVENTION

The hollow bodies in question may be of any known type, especially bottles or tanks. The invention is beneficial in the case of a tank. It is most particularly beneficial in the case of a fuel tank. It also applies advantageously to any other hollow body associated with the operation of the fuel supply circuit of an engine intended, in particular, for equipping a motor vehicle.

The plastic is a polymeric plastic which is solid under normal conditions of use of the hollow body, such as known elsewhere. This plastic may consist of one or more polymers, in general thermoplastics. Often, one or more hydrocarbon thermoplastic polymers are employed, these possessing a linear basic molecular structure in which possible substituents are non-aromatic. The polymers may be homopolymers, copolymers or their blends. By way of such polymers, it is possible to employ, for example, polyolefins or vinyl chloride polymers. Good results have been obtained using a polyolefin, in particular using a polyethylene. Excellent results have been obtained using a high-density polyethylene (HDPE).

In addition to the polyalkyleneimine, one or more usual additives may obviously be added to the plastic, such as antioxidants, stabilizers, pigments or other additives, insofar as they do not appreciably affect the properties, especially the mechanical properties, or the behaviour of the hollow body during its manufacture or during its subsequent use.

The hollow bodies intended include a plastic. They may in their entirety essentially consist of a single plastic or include at least one part essentially consisting of a plastic to which is added at least one polyalkyleneimine and moreover one or more other parts essentially consisting of one or more other plastics or one or more other materials. By part of the hollow body is meant here to designate in particular one layer of a multilayer hollow body.

Among polyalkyleneimines, it is possible to employ in particular unsubstituted, branched or linear, homopolymers or copolymers, or homopolymers or copolymers substituted on the amine functions by alkyl or acyl groups. The molecular weight of these polyalkyleneimines may generally vary from 300 to 1,000,000. Preferably, this molecular weight is at least 1,000. Excellent results have been obtained with a polyethyleneimine (PEI).

The polyalkyleneimine may be added to the plastic by mixing, prior to its processing. Good results have been obtained by adding the polyalkyleneimine to the plastic while it is being processed. The polyalkyleneimine is advantageously added to the plastic at a temperature which substantially reduces its viscosity, in practice at a temperature of at least 40° C., more preferably at a temperature of at least 70° C. Advantageously, this temperature does not exceed 250° C. and more preferably does not exceed 200° C.

Excellent results have been obtained by using, at this stage, a pure polyalkyleneimine. In principle, the polyalkyleneimine is not diluted, in particular it is not diluted in water. In practice, "water-free" grades of polyalkyleneimine are used.

The proportion of polyalkyleneimine to be added to the plastic may be optimized case by case, depending especially on the polyalkyleneimine, on the plastic, on the type of hollow body and on the use which is envisaged for it. Preferably, at least 0.01% by weight of polyalkyleneimine with respect to the weight of plastic is added, more preferably still at least 0.05%. Advantageously, no more than 20% by weight of polyalkyleneimine with respect to the weight of plastic is added, more advantageously still no more than 10%.

The process according to the invention includes the usual steps in manufacturing a hollow body. In particular, it may include processing of the plastic or plastics and/or of the other material or materials intended to form the hollow body. In the case of processing one or more plastics, mention may be made, by way of non-limiting examples of processing methods, of injection, extrusion or extrusion-blowing. In particular, extrusion-blowing is advantageously used as the processing.

The process according to the invention may moreover include a surface treatment of at least part of the hollow body, including at least one surface layer essentially consisting of the plastic to which at least one polyalkyleneimine has been added.

It is possible to make the entire hollow body undergo the surface treatment. It is also possible to apply it only to part of said hollow body, in particular to its inside or to its outside. Good results have been obtained by surface treating only the inside of the hollow body.

The hollow body subjected to the surface treatment may essentially consist only in the surface layer to be treated of the plastic to which at least one polyalkyleneimine has been added. However, excellent results have been obtained by surface treating, in its entirety, a hollow body essentially consisting of a single plastic to which at least one polyalkyleneimine has been added.

By surface treatment is meant to denote any known surface treatment for the purpose of improving the impermeability, such as, especially, fluorination or sulphonation followed by neutralization.

Preferably, the surface treatment includes at least one sulphonation step and at least one neutralization step.

The sulphonation may be carried out in one or more successive steps. Good results have been obtained in a single step.

The sulphonation is carried out in the usual manner and under the usual conditions for one skilled in the art. The hollow body or that part of the hollow body to be treated is brought into contact with sulphur trioxide diluted in an inert compound in liquid or gas phase. Preferably, a dry inert gas, for example nitrogen, carbon dioxide, sulphur dioxide or air, is used. It is important to avoid the presence of water vapour which could lead, by reaction with the sulphur trioxide, to the formation of droplets of sulphuric acid. In general, from 0.1 to 35% by volume of sulphur trioxide is incorporated, preferably from 15 to 30%. The contact time is inversely proportional to the concentration of sulphur trioxide. In general it may be from 0.1 to 20 minutes. The temperature and pressure may be adapted, especially depending on the other operating parameters. In particular, it is possible to work at ambient temperature and pressure.

Often, the hollow body or container, which contains residual sulphur trioxide, is purged after sulphonation, for example by using an inert gas such as nitrogen. The residual sulphur trioxide may also be neutralized by a very short injection of ammonia, of the order of a few seconds, in particular for less than 10 seconds. In the latter case, it is then preferable to rinse, usually with water, the hollow body or that part of the hollow body which will subsequently be subjected to the neutralization step.

The neutralization may be carried out in one or more successive steps.

It may be performed on the entire hollow body or at least on that part of the said hollow body which has to be surface treated and which has been subjected to sulphonation.

The neutralization may be carried out in any usual manner for one skilled in the art, in particular in the conventional manner which includes at least one step in the presence of ammonia. Preferably, at least one neutralization step is carried out by contacting with at least one polyamine compound.

By polyamine compound is meant to denote an aliphatic compound containing at least two amine functions. As polyamine compound, it is advantageous to use a polyalkylenepolyamine. Among polyalkylenepolyamines, good results have been obtained in particular with triethylenetetramine (TETA). It is also advantageous to use, as polyamine compound, an alkylenepolyamine. Among alkylenepolyamines, good results have been obtained with ethylenediamine (EDA). As polyamine compound it is also beneficial to use a polyalkyleneimine. Among polyalkyleneimines, it is possible to employ unsubstituted, branched or linear, homopolymers or copolymers, or homopolymers or copolymers substituted on the amine functions by alkyl or acyl groups. The molecular weight of these polyalkyleneimines may generally vary from 300 to 1,000,000. Preferably, this molecular weight is at least 1,000. Excellent results have been obtained by using a polyethyleneimine (PEI) as a polyamine compound during at least one neutralization step.

It is also possible at this stage to use one or more polyamine compounds. For example, a mixture of polyamine compounds, based on one or more polyalkylenepolyamines, alkylenepolyamines and/or one or more polyalkyleneimines, may be employed. Such a mixture may, in particular, make it possible to combine the advantages of the processing of several polyalkyleneimines of substantially different molecular weights. It is preferable not to employ only one polyalkyleneimine of molecular weight greater than 500,000. Advantageously, a mixture of several polyethyleneimines is employed.

During this neutralization step, the polyamine compound is generally present in an amount of at least 0.05% by volume, preferably in an amount of at least 0.1% by volume, more preferably still in an amount of at least 1% by volume. The polyamine compound may at this stage be used pure or in diluted form. Advantageously, it is employed in diluted form, in particular not exceeding 20% by volume, more particularly still without exceeding 10% by volume. The polyamine compound may, at this stage, especially be diluted in water.

For the neutralization, the hollow body may be brought into contact with a neutralizing solution in liquid or gas form. In practice, it is simple to fill the hollow body with an aqueous neutralizing solution in liquid form. This solution may in particular be employed in the form of a sprayed jet.

The contact time for a neutralization step may easily be optimized, by one skilled in the art, based on a few defining trials, in relation to the other operating parameters. In practice, a short duration is sufficient. Good results have been obtained without having to exceed 5 minutes. Often, the said contact time is at least 10 seconds, preferably at least 1 minute.

The neutralization may be carried out over a wide temperature range, for example from 0° to 100° C., in particular when the polyamine compound is diluted in water. Good results have been obtained at ambient temperature.

The pressure may also be adapted to the other operating parameters. Good results have been obtained at atmospheric pressure.

After neutralization, the hollow body is, if necessary, rinsed and/or dried, so as to remove from it the neutralizing agents and the residual reaction products.

The surface treatment of the hollow body must be performed to a depth sufficient to improve its impermeability substantially. In practice, the depth treated is often of the order of 5 to 30 microns. Preferably, it is at least 10 microns.

It may prove advantageous for the processing to be carried out rapidly, in particular immediately, followed by the surface treatment.

The process according to the present invention makes it possible to obtain hollow bodies whose impermeability, in particular after surface treatment, has been improved remarkably.

The subject of the present invention is therefore also a hollow body capable of being obtained by the process as described hereinabove and including a plastic to which at least one polyalkyleneimine has been added.

For the various definitions relating to this aspect of the invention, reference may be made to the definitions given previously for the relevant concepts.

EXAMPLES

Examples 1R to 3R, 6R, 7R, 10R and 11R which follow are given by way of comparison.

Examples 4, 5, 8, 9, 12 and 13 illustrate the invention in a non-limiting way.

The permeability here is expressed in $g.mm/m^2.d$, that is in grams of fuel times millimeters of thickness of the hollow body per square meter of surface for exchange with the outside and per day. In fact, it is logical to consider the permeability of a hollow body as being proportional to its thickness and inversely proportional to the exchange surface area which it has with the outside, rather than to be referred to a permeability just expressed in grams of fuel per day. In fact, such a measurement would not take into account the effect of scale, well known to one skilled in the art, for example in the case of hollow bodies, between a bottle, of small thickness and surface area, and a fuel tank, of greater thickness and exchange surface area.

By steady-state permeability is meant to denote this characteristic when it has become stable over time. The time necessary to achieve this is obviously related especially to the characteristics intrinsic to the hollow body and cannot be defined absolutely. By way of order of magnitude, it is possible in particular to estimate that the permeability of a bottle is in the steady state after approximately 1 month, while approximately 3 months are necessary to reach the same state in the case of a tank.

EXAMPLE 1R

A high-density polyethylene (HDPE) bottle, having an internal volume of 360 $cm^3$, a thickness of 2 mm and an internal surface area of 280 $cm^2$, was produced by extrusion-blowing. The HDPE used was of the PHILLIPS type having an average density of 0.946 $g/cm^3$, a HLMI (High Load Melt Index) melt flow index, measured according to the ASTM 1238 (1987) standard, of from 5.4 to 6.8 g/10 min, and containing 1 g/kg of the stabilizer IRGANOX® 1076.

The internal surface area of this bottle was then brought into contact, by injection, and held for 10 minutes at ambient temperature and atmospheric pressure, with a gas flow containing 15% by volume of sulphur trioxide diluted in nitrogen.

The bottle was then purged with nitrogen for 5 minutes at ambient temperature and at atmospheric pressure.

Next, it was filled at ambient temperature and at atmospheric pressure with 200 $cm^3$ of an aqueous solution containing 10% by volume of ammonia, and then stirred for 5 minutes.

Finally, the bottle was emptied, rinsed in water and dried in an oven at 60° C. overnight.

The permeability of this bottle was evaluated using a mixture of 92.5% by volume of lead-free CEC RF 08-A-85 petrol, having an octane number of 95, 5% by volume of methanol and 2.5% by volume of ethanol (which mixture is known in the United States by the name TF2=Test Fuel 2, hereinafter called TF2 mixture). The bottle was filled with 300 $cm^3$ of this mixture, sealed, weighed and stored in a room at 40° C.

After 1 month, in the steady state, its permeability, measured by weight loss according to the ECE 34 (Appendix 5) standard, was 14.3 $g.mm/m^2.d$.

By way of comparison, the same bottle, not treated, was losing 71 $g.mm/m^2.d$ in the steady state.

EXAMPLE 2R

A bottle identical to the one in Example 1R was manufactured in the same way.

Its permeability was evaluated in the same way, but with a mixture of 90% by volume of lead-free CEC RF 08-A-85 petrol, having an octane number of 95, and 10% by volume of ethanol (a mixture known in the United States by the name TF1=Test Fuel 1, hereinafter called TF1 mixture).

After 1 month, in the steady state, the permeability of the bottle, measured by weight loss according to the ECE 34 (Appendix 5) standard, was 21.4 $g.mm/m^2.d$.

EXAMPLE 3R

A test identical to the one according to Example 2R was carried out, except that 0.1% of water was added to the TF1 mixture.

After 1 month, in the steady state, the permeability of the bottle, measured by weight loss according to the ECE 34 (Appendix 5) standard, was 50 $g.mm/m^2.d$.

EXAMPLE 4

A bottle was produced by extrusion-blowing which is similar to the one according to Example 1R, but having previously added to the HDPE, in a high-speed mixer at ambient temperature, 0.2% by weight with respect to the HDPE of pure polyethyleneimine, of "water-free" grade, having a molecular weight of approximately 20,000 and having the trade name LUPASOL® WF.

The bottle thus obtained was surface treated and its permeability evaluated in the same way as in Example 2R.

After 1 month, in the steady state, the permeability of the bottle, measured by weight loss according to the ECE 34 (Appendix 5) standard, was 10.2 $g.mm/m^2.d$.

EXAMPLE 5

A test identical to the one according to Example 4 was carried out, except that 0.1% of water was added to the TF1 mixture.

After 1 month, in the steady state, the permeability of the bottle, measured by weight loss according to the ECE 34 (Appendix 5) standard, was 21.4 $g.mm/m^2.d$.

EXAMPLE 6R

A bottle identical to the one according to Example 1R was treated in the same way, except that the neutralization was carried out by filling the bottle with an aqueous solution containing 5% by volume of LUPASOL WF polyethyleneimine.

The permeability of this bottle was evaluated in the same way as in Example 2R.

After 1 month, in the steady state, the weight loss, according to the ECE 34 (Appendix 5) standard, was 2.14 $g.mm/m^2.d$.

EXAMPLE 7R

A test identical to the one according to Example 6R was carried out, except that 0.1% of water was added to the TF1 mixture.

After 1 month, in the steady state, the weight loss, according to the ECE 34 (Appendix 5) standard, was 5 $g.mm/m^2.d$.

EXAMPLE 8

A bottle identical to the one according to Example 4 was produced in the same way.

This bottle was surface treated and its permeability evaluated in the same way as in Example 6R.

After 1 month, in the steady state, its permeability, measured by weight loss according to the ECE 34 (Appendix 5) standard, was 1.07 g.mm/m².d.

EXAMPLE 9

A bottle identical to the one according to Example 5 was produced in the same way.

This bottle was surface treated and its permeability evaluated in the same way as in Example 7R.

After 1 month, in the steady state, its permeability, measured by weight loss according to the ECE 34 (Appendix 5) standard, was 2.85 g.mm/m².d.

EXAMPLE 10R

A high-density polyethylene (HDPE) fuel tank, having an internal volume of 60 liters, an average thickness of 5 mm and an internal surface area of 1.5 m², was produced by extrusion-blowing. The HDPE used had an average density of 0.948 g/cm³, a HLMI melt flow index of 3.4 g/10 min, and contained 0.2 g/kg of carbon black and 2 g/kg of stabilizer IRGANOX® B 225.

Next, the internal surface area of this tank was brought into contact, by injection, and holding for 2 minutes at 49° C. and atmospheric pressure, with a gas flow containing 15% by volume of sulphur trioxide diluted in nitrogen.

The tank was then purged with nitrogen for 2 minutes at ambient temperature and at atmospheric pressure.

Next, it was filled at ambient temperature and at atmospheric pressure with a mixture containing 70% by volume of ammonia and 15% by volume of air humidified by 15% by volume of water in the form of fine atomized droplets, for 100 seconds.

Finally, the tank was emptied, rinsed in water and dried in an oven at 60° C. overnight.

The permeability of the tank was evaluated using a TF1 mixture. The tank was filled with 30 liters of this mixture, sealed, weighed and stored in a room at 40° C.

After 3 months, in the steady state, its permeability, measured by weight loss according to the ECE 34 (Appendix 5) standard, was 10 g.mm/m².d.

EXAMPLE 11R

A fuel tank identical to the one according to Example 10R was produced in the same way.

This tank was surface treated in the same way as in Example 10R, except that a second step of neutralizing the tank was added, during which it was filled with 3 liters of an aqueous solution containing 5% by volume of LUPASOL P polyethyleneimine having a molecular weight lying between 600,000 and 1,000,000, and then stirred for 3 minutes.

After 3 months, in the steady state, the permeability of this tank, measured by weight loss according to the ECE 34 (Appendix 5) standard, was 1 g.mm/mm².d.

EXAMPLE 12

A fuel tank was produced by extrusion blowing which was similar to the one according to Example 10R, but by adding to the HDPE, during the extrusion, at a temperature of 70° C., 0.3% by weight with respect to the HDPE of pure LUPASOL WF polyethyleneimine.

The tank obtained was surface treated and its permeability evaluated in the same way as in Example 10R.

After 3 months, in the steady state, its permeability was measured by weight loss according to the ECE 34 (Appendix 5) standard, was 5 g.mm/m².d.

EXAMPLE 13

A fuel tank identical to the one according to Example 12 was produced in the same way.

This fuel tank was surface treated and its permeability evaluated in the same way as in Example 11R.

After 3 months, in the steady state, the permeability of this tank, measured by weight loss according to the ECE 34 (Appendix 5) standard, was 0.5 g.mm/mm².d.

What is claimed is:

1. A process for manufacturing a plastic hollow body associated with a fuel supply circuit, comprising:
    treating a surface of at least a portion of the hollow body consisting essentially of a plastic including polyalkyleneimine with at least one sulphonation step; and
    treating said surface with at least one neutralization step carried out by contacting said surface with at least one polyamine compound.

2. The process according to claim 1, in which the plastic is a high-density polyethylene.

3. The process according to claim 1, in which the polyalkyleneimine is a polyethyleneimine.

4. The process according to claim 1, in which the polyamine compound used during at least one neutralization step is a polyethyleneimine.

5. The process according to claim 1, in which the at least one neutralization step is carried out by contacting with a mixture of polyamine compounds.

* * * * *